United States Patent [19]

Muench et al.

[11] Patent Number: 4,618,668
[45] Date of Patent: Oct. 21, 1986

[54] PREPARATION OF POLYPHENYLENE ETHERS

[75] Inventors: Volker Muench, Ludwigshafen; Juergen Hambrecht, Heidelberg; Walter Himmele, Walldorf; Adolf Echte; Johann Swoboda, both of Ludwigshafen, all of Fed. Rep. of Germany

[73] Assignee: BASF Aktiengesellschaft, Ludwigshafen, Fed. Rep. of Germany

[21] Appl. No.: 722,154

[22] Filed: Apr. 11, 1985

[30] Foreign Application Priority Data

Apr. 14, 1984 [DE] Fed. Rep. of Germany ....... 3414237

[51] Int. Cl.[4] .................. C08G 65/44; C08G 65/46
[52] U.S. Cl. .................... 528/215; 528/212; 528/214; 528/216; 528/217; 528/218; 528/486; 528/492
[58] Field of Search ............ 528/212, 214-218, 528/486, 492

[56] References Cited

U.S. PATENT DOCUMENTS

| 3,129,625 | 4/1964 | Jones | 83/624 |
| 3,306,874 | 2/1967 | Hay | 528/215 |
| 3,306,875 | 2/1967 | Hay | 528/215 |
| 3,313,776 | 4/1967 | Borman | 528/215 |
| 3,378,505 | 4/1968 | Hay | 528/215 |
| 3,661,848 | 5/1972 | Cooper | 528/215 |
| 4,028,341 | 6/1977 | Hay | 528/215 |
| 4,054,553 | 10/1977 | Olander | 528/215 |
| 4,196,278 | 4/1980 | Bennett, Jr. et al. | 528/215 |

FOREIGN PATENT DOCUMENTS

| 0045395 | 7/1981 | European Pat. Off. . |
| 0071093 | 7/1982 | European Pat. Off. . |
| 2162299 | 6/1972 | Fed. Rep. of Germany . |
| 2505328 | 8/1975 | Fed. Rep. of Germany . |
| 2738889 | 3/1978 | Fed. Rep. of Germany . |
| 3314711 | 10/1983 | Fed. Rep. of Germany . |

OTHER PUBLICATIONS

European Search Report-EP 85 10 3942.

Primary Examiner—Lester L. Lee
Attorney, Agent, or Firm—Keil & Weinkauf

[57] ABSTRACT

High molecular weight polyphenylene ethers are prepared from monohydric phenols by an oxidative coupling reaction with oxygen in the presence of a solvent and of a catalyst complex consisting of a copper salt and an organic amine of the general formula

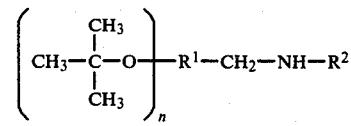

where $R^1$ is $C_2$-$C_{20}$-alkylidene, preferably $C_2$-$C_{12}$-alkylidene, or alkenylidene, $R^2$ is H or $C_1$-$C_{12}$-alkyl, preferably $C_1$-$C_4$-alkyl, or $C_5$-$C_8$-cycloalkyl, each of which is unsubstituted or substituted by functional groups, and n is an integer from 1 to 4, preferably 1 or 2. Preferred functional groups are —$OR^3$, —$NHR^3$ or —$SR^3$, in which $R^3$ is H $C_1$-$C_{12}$-alkyl or $C_5$-$C_8$-cycloalkyl, and the most suitable amines are 3-tert.-butoxypropylamine, 4-tert.-butoxybutylamine, 3-tert.-butoxy-2-methylpropylamine, 3-tert.-butoxy-2,3-dimethylpropylamine, 3-tert.-butoxy-2-methyloctylamine and N-methyl-N-(4-tert.-butoxybutyl)-amine. The polyphenylene ethers can be processed to moldings by a thermoplastic method.

3 Claims, No Drawings

PREPARATION OF POLYPHENYLENE ETHERS

The present invention relates to a process for the preparation of high molecular weight polyphenylene ethers from monohydric phenols which possess alkyl substituents in the two ortho positions and may additionally possess an alkyl substituent in a meta position but not in the para position, by an oxidative coupling reaction with oxygen at from 10° to 50° C. in the presence of a catalyst complex consisting of a copper salt and an organic amine and in the presence of an aromatic $C_6$–$C_{10}$-hydrocarbon as solvent, in an amount of from 1 to 20 parts by weight per part by weight of the monomeric phenol, and in the presence or absence of an activator, and working up of the resulting polymer solution.

In such processes for the self-condensation of monohydric phenols in the presence of oxygen, the catalyst systems required are those which initiate the oxidative coupling reaction in the presence of a solvent.

Polyphenylene ethers and processes for their preparation are known per se, and are described in a large number of publications, for example in U.S. Pat. Nos. 3,306,874, 3,306,875, 3,365,422, 3,639,656, 3,642,699, 3,722,299, 3,838,102 and 3,661,848 and in German Laid-Open Application DOS Nos. 2,505,328, 2,738,889, 3,033,813, 3,214,425 and 3,314,711. However, all of these reaction routes which have been described to data have the disadvantages that the reaction times required for the oxidative polycondensation in the preparation of fairly high molecular weight polycondensates are too long, and diphenoquinone formation, a known competing reaction, takes place, with the result that the yield of polyphenylene ethers is in general less than 99% by weight, based on the phenol employed.

U.S. Pat. No. 3,306,874, Nos. DE-A-2 505 328, 2 738 889 and 3 314 711 describe the use of amines carrying tertiary butyl groups, in copper salt catalyst complexes. However, these compounds contain the tertiary butyl group bonded directly to the nitrogen. Amines of this type, eg. N,N'-di-tert.-butylethylenediamine, in copper catalyst complexes result in short polymerization times coupled with relatively large amounts of by-products. However, the presence of by-products is a substantial disadvantage, particularly for working-up processes based on the total isolation method, as in, for example, multi-stage evaporation (cf. No. EP-A1-71093).

It is an object of the present invention to provide an amine-copper catalyst system which gives polymers having a comparatively high intrinsic viscosity and a low diphenoquinone content in high yield and in short reaction times.

We have found that this object is achieved, in accordance with the invention, if the amine component used in the catalyst complex is an amine of the general formula (I)

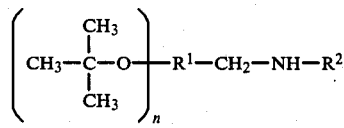

where $R^1$ is $C_2$–$C_{20}$-alkylidene or alkenylidene, $R^2$ is hydrogen, or $C_1$–$C_{12}$-alkyl or $C_5$–$C_8$-cycloalkyl, each of which is unsubstituted or substituted by functional groups, and n is an integer from 1 to 4. Preferably, the functional group in $R^2$ is —$OR^3$, —$NHR^3$ or —$SR^3$, where $R^3$ is H, $C_1$–$C_{12}$-alkyl or $C_5$–$C_8$-cycloalkyl. Other preferred amines of the formula (I) are those in which $R^1$ is $C_2$–$C_{12}$-alkylidene, $R^2$ is H or $C_1$–$C_4$-alkyl, and n is 1 or 2. The compounds as claimed in subclaim 4 are particularly preferred.

For the purposes of the present invention, high molecular weight polyphenylene ethers are the compounds obtained by oxidative coupling of alkylphenols to give a chain of alkyl-substituted benzene rings bonded in the para-position by oxygen atoms forming ether-like bonds. The polymers generally have a molecular weight of from 15,000 to 90,000, preferably from 20,000 to 80,000, determined by the method described in Macromolecular Synthesis 1 (1978), 83. High molecular weight polyphenylene ethers, also referred to as poly(-phenylene oxides) or poly(phenylene ethers), have long been known per se from the literature (cf. for example U.S. Pat. Nos. 3,661,848, 3,129,625 or 3,378,505), so that further description is unnecessary here.

The monohydric phenols which are used for the preparation of the high molecular weight polyphenylene ethers, and which possess alkyl substituents in the two ortho positions and may additionally possess an alkyl substituent in the meta position but not in the para position, are conventional phenols, such as 2,6-dimethylphenol, 2,6-diethylphenol, 2-methyl-6-ethylphenol, 2-methyl-6-propylphenol, 2,6-dibutylphenol and 2,3,6-trimethylphenol, and mixtures of these. A preferred phenol is 2,6-dimethylphenol, which is isolated from the phenols, such as phenol, o-cresol, m-cresol and the phenols possessing a larger number of nuclei, such as 2,6-dimethyl-1-hydroxydiphenyl, which interfere with the polymerization, by the methods described in Houben-Weyl-Müller, Methoden der organischen Chemie, Phenole, Part 2, Vol. 6/1C, Georg Thieme Verlag, Stuttgart, 1976, page 1187 et seq.

The polycondensation is usually carried out by passing oxygen into the solution of the monomer in the presence of a catalyst complex, the solution being at from 10° to 50° C., preferably from 15° to 40° C. However, it is also possible to use air. The flow rate of the oxygen is essentially the same as that stated in U.S. Pat. Nos. 3,306,874 and 3,306,875.

The catalyst systems used for the conventional polycondensations are usually a combination of an amine, eg. n-dibutylamine, diethylamine, picoline, a pyridine base, etc., with a copper salt, such as copper(I) bromide, copper(I) chloride, copper(I) iodide, copper(II) bromide, copper(II) chloride, copper(II) acetate and others. The amines are usually employed in amounts of from 200 to 2,000, preferably from 800 to 1,000, mol %, based on the copper salt employed, and in amounts of from 0.5 to 50, preferably from 2 to 20, mol %, based on the phenol used. The concentration of the amines can vary within wide limits, but low concentrations are advantageous. The concentration of the copper salts is kept low, and is preferably from 0.2 to 2.5 moles per 100 moles of the monomer.

The amount of solvent is usually from 1 to 20 parts by weight per part by weight of the monomer, ie. not more than a 20-fold excess of the solvent. In the process according to the application, the solvent used should be an aromatic $C_6$–$C_{10}$-hydrocarbon. Particularly suitable hydrocarbons are toluene, ethylbenzene, xylene, diethylbenzene or mixtures of these, toluene or ethylbenzene preferably being used. The solvents are preferably employed in an amount of from 1 to 10 parts by weight per part by weight of the phenol. To increase the catalyst solubility, a small amount of an alkanol, such as methanol, ethanol or isopropanol, may also be present. Moreover, the reaction mixture can contain an activator, such as a diarylguanidine or diarylformamidine (cf. U.S. Pat. No. 3,544,515).

Examples of amines of the general formula (I) which are used according to the invention in the copper catalyst complex are amines in which $R^1$ is a straightchain or branched alkylidene or alkenylidene group of 2 to 20, preferably 2 to 12, carbon atoms, $R^2$ is hydrogen, $C_1$-$C_{12}$-alkyl, preferably $C_1$-$C_4$-alkyl, or $C_5$-$C_8$-cycloalkyl, and $R^2$ may carry —$OR^3$, $NHR^3$- or $SR^3$ groups in which $R^3$ is hydrogen, $C_1$-$C_{12}$-alkyl or $C_5$-$C_8$-cycloalkyl. The amines can contain from 1 to 4, preferably 1 or 2, tert.-butoxy groups. Examples of amines which, according to the invention, are preferably used are 3-tert.-butoxyprop-1-ylamine, 4-tert.-butoxypent-1-ylamine, 6-tert.-butoxyhex-1-ylamine, 7-tert.-butoxyhept-1-ylamine, 3-tert.-butoxy-2-methyl-prop-1-ylamine, 3-tert.-butoxy-2,3-dimethylprop-1-ylamine, 3-tert.-butoxy-2-methyloct-1-ylamine, 5,5-bis-(tert.-butoxy)-3,4-dimethylpent-1-ylamine, N-methyl-N-[4-tert.-butoxybutyl]-amine, N-ethyl-N-[4,9-bis-(tert.-butoxy)-5,6-dimethyldecyl]amine, N-3-oxahexyl-N-[2-(2-oxa-3,3-dimethylbutyl)-octyl]-amine and N-3-hydroxybutyl-N-[2-4-(3-oxa-4,4-dimethylpentyl)-8-oxa-9,9-dimethyldecyl]-amine. Particularly preferred amines of the general formula (I) are 3-tert.-butoxy-prop-1-ylamine, 4-tert.-butoxybut-1-ylamine, 3-tert.-butoxy-2-methylprop-1-ylamine, 3-tert.-butoxy-2,3-dimethylprop-1-ylamine, 3-tert.-butoxy-2-methyloct-1-ylamine and N-methyl-N-(4-tert.-butoxybutyl)-amine.

To work up the resulting polymer solution, the polycondensation is terminated, for example by adding an aqueous solution of disodium ethylenediaminetetraacetate, and at the same time the metal component is removed by forming a complex and separating this off in the aqueous phase, these steps being carried out, when the polycondensation is complete, by conventional methods which are known from the literature cited at the outset. The polymer can be isolated from the resulting polyphenylene ether solution by a conventional method, for example by precipitation with methanol. However, a multi-stage evaporation procedure, in which the solvent is removed by evaporation, is preferred (cf. No. EP-A1-71093 and No. DE-A-3315802).

The particular advantages obtained with the invention are that a polymer having a high intrinsic viscosity is obtained in a short time and in yields greater than 99% by weight, based on the monomer used. This means that the amount of diphenoquinone is low, being no more than 1% by weight. As a result of using the novel amines in the copper catalyst complex, the polyphenylene ethers prepared possess substantially less coloration than those synthesized by other methods. Another advantage is that the polymerization method used (passing in a gas, vigorous stirring) prevents pronounced foaming of the reaction solution and hence does not give rise to difficulties during the process, although the longchain linear alkyls employed, which carry a polar group at one end, are in fact intended to act as surfactants. Furthermore, the deposition of copper-containing precipitates is prevented in the novel process.

The resulting polyphenylene ethers can be processed to conventional moldings, either alone or as a mixture with other polymers, in particular with styrene polymers, by a conventional method.

In the Examples below, the tetramethyldiphenoquinone contents (DPQ contents) were determined by means of high pressure liquid chromatography (HPLC), directly after the polymerization but before the addition of the stabilizer, on solutions diluted with chloroform.

EXAMPLES 450 g of toluene are initially taken in a glass flask having a capacity of 1 liter and provided with a reflux condenser, a paddle stirrer and an oxygen inlet tube, which extends to the bottom of the flask. A catalyst mixture which consists of 0.72 g (0.005 mole) of Cu-(I)Br, 0.01 mole of the particular amine and 10 ml of toluene and has been homogenized in a conical flask at 50° C. in the course of 5 minutes with vigorous stirring is added to the toluene mentioned above. The solution of the catalyst in toluene is gassed with 50 l/h of oxygen at a stirrer speed of 350 rpm, and 116 g of a 50% strength by weight solution of 2,6-dimethylphenol in toluene (purity of the dimethylphenol: 99.9% by weight) are metered in continuously in the course of ½ hour. The mixture is then gassed with 50 l/h of oxygen for a further 0.5 hour, and the reaction temperature is kept at 26°–28° C. over the entire period. Thereafter, the reaction is terminated by adding 20 g of a 10% strength by weight aqueous solution of disodium ethylenediaminetetraacetate at room temperature, as described in U.S. Pat. No. 3,306,874. The DPQ content of the reaction solution is determined by HPLC, and is also listed in Table 1. After the aqueous phase has been separated off, the polyphenylene ether is precipitated by adding three times its amount of methanol, and is washed, and dried at 60° C. under reduced pressure. The intrinsic viscosity is determined at 25° C. in 0.5% strength by weight solutions in chloroform, and is likewise listed in Table 1.

COMPARATIVE EXAMPLES

The procedure described in the Examples according to the invention is followed, except that, instead of the amines used according to the invention, prior art amines from U.S. Pat. No. 3,314,711 are used. Working up is also carried out similarly to the Examples according to the invention.

TABLE 1

EXAMPLES AND COMPARATIVE EXAMPLES

| Example No. | Amine | Polyphenylene ether Yield* (% by weight) | Intrinsic viscosity (dl/g) | Diphenoquinone yield** (% by weight) | Comments on the polymerization |
|---|---|---|---|---|---|
| 1 | 3-tert.-butoxypropyl-amine | 99.3 | 0.83 | 0.5 | none |
| 2 | 3-tert.-butoxy-2-methylpropylamine | 99.3 | 0.96 | 0.6 | none |

TABLE 1-continued

EXAMPLES AND COMPARATIVE EXAMPLES

| Example No. | Amine | Polyphenylene ether Yield* (% by weight) | Intrinsic viscosity (dl/g) | Diphenoquinone yield** (% by weight) | Comments on the polymerization |
|---|---|---|---|---|---|
| 3 | 3-tert.-butoxy-2,3-dimethylpropylamine | 99.3 | 0.72 | 0.5 | none |
| 4 | 4-tert.-butoxybutyl-amine | 99.3 | 0.81 | 0.5 | none |
| 5 | 3-tert.-butoxy-2-methyloctylamine | 99.3 | 0.96 | 0.5 | none |
| 6 | N—methyl-N—(4-tert.-butoxybutyl)-amine | 99.0 | 0.78 | 0.9 | none |
| Comparative examples (not according to the invention) | | | | | |
| A | di-n-butylamine | 96.3 | 0.48 | 2.1 | Precipitation of copper salt |
| B | N,N'—di-tert.-butyl-ethylenediamine | 98.4 | 0.85 | 1.4 | none |
| C | N,N'—di-tert.-butyl-ethylenediamine (15% by weight) di-n-butylamine (30% by weight) dimethylbutylamine (55% by weight) | 98.1 | 0.56 | 1.9 | Precipitation of copper salt |
| D | n-dodecylamine | 97.8 | 0.61 | 1.9 | pronounced foaming precipitation of copper salt |

*based on 2,6-dimethylphenol employed, measured after precipitation
**based on 2,6-dimethylphenol employed, measured by means of HPLC from the solution

We claim:

1. A process for the preparation of a high molecular weight polyphenylene ether from a monohydric phenol which possesses alkyl substituents in the two ortho positions and may additionally possess an alkyl substituent in a meta position but not in the para position, by an oxidative coupling reaction with oxygen at from 10° to 50° C. in the presence of a ctalyst complex consisting of a copper salt and an organic amine and in the presence of an aromatic $C_6$–$C_{10}$-hydrocarbon as solvent, in an amount of from 1 to 20 parts by weight per part by weight of the monomeric phenol, and in the presence or absence of an activator, the reaction is terminated, the copper component is separated from the reaction mixture and the high molecular weight polyphenylene ether is isolated from the solution, wherein the amine component used in the catalyst complex is an amine of the formula I

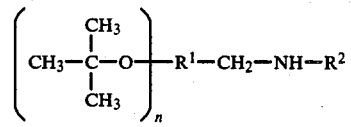

where $R^1$ is $C_2$–$C_{20}$-alkylidene or alkenylidene, $R^2$ is H or $C_1$–$C_{12}$-alkyl or $C_5$–$C_8$-cycloalkyl, each of which is unsubstituted or substituted by —$OR^3$, —$NHR^3$ or —$SR^3$, where $R^3$ is H, $C_1$–$C_{12}$-alkyl or $C_5$–$C_8$-cycloalkyl, and n is an integer from 1 to 4.

2. The process of claim 1, wherein, in the amine (I), $R^1$ is $C_2$–$C_{12}$-alkylidene, $R^2$ is H or $C_1$–$C_4$-alkyl, and n is 1 or 2.

3. The process of claim 1, wherein the amine (I) is 3-tert.-butoxypropylamine, 4-tert.-butoxybutylamine, 3-tert.-butoxy-2-methylpropylamine, 3-tert.-butoxy-2,3-dimethylpropylamine, 3-tert.-butoxy-2-methyloctylamine or N-methyl-N-(4-tert.-butoxybutyl)-amine.

* * * * *